Patented Apr. 7, 1953

2,634,269

UNITED STATES PATENT OFFICE 2,634,269

PROCESS FOR MANUFACTURING CAPROLACTAM

David C. England, Marshallton, Del., assignor to E. I. du Pont de Nemours and Company, Wilmington, Del., a corporation of Delaware No Drawing. Application September 21, 1951, Serial No. 247,755

12 Claims. (Cl. 260—239.3)

This invention relates to a new method for preparing caprolactam.

Caprolactam has heretofore been made by the Beckmann rearrangement of cyclohexanoneoxime and by the controlled hydrolysis of epsilon-aminocapronitrile. The rearrangement of cyclohexanone-oxime may be effected with strong sulfuric, or other acid, or catalytically over a dehydration catalyst. The acid catalyzed rearrangement is a highly exothermic reaction and precautions have to be taken to keep the reaction under control. The expedients usually employed for keeping the reaction from going explosively consist either in rearranging only a small amount of the ketoxime at a time or adding the ketoxime to the acid at such a rate that the amount of heat evolved is just enough to maintain the mixture at the temperature required for the rearrangement reaction. The acid catalyzed method is not very satisfactory because lactam is obtained in admixture with a large amount of acid, from which it has to be isolated by neutralization, and because the amount of ketoxime which can be rearranged at any one time is limited by the need of having to keep under control a highly exothermic reaction. The catalytic vapor phase method is deficient in that a large amount of hexene-5-nitrile is simultaneously formed and this adds to costs. The method of controlled hydrolysis of epsilon-aminocapronitrile is difficult to operate on a practical scale because the reaction is competitive with that of polymer formation. Because caprolactam is a polyamide precursor, there is a continuing active search for more efficient and practical methods for its preparation. This invention is concerned with the provision of such a method.

The principal object of this invention is a new and improved method for the preparation of caprolactam. Other objects will appear from the following detailed description of the invention.

According to this invention, caprolactam is obtained directly from nitrocyclohexane by contacting the nitrocyclohexane with a dehydration catalyst heated to between 150° and 450° C.

Generally nitrocyclohexane as such or in solution is vaporized in a chamber in the presence either of an inert gas such as nitrogen or a reducing gas such as hydrogen or carbon monoxide, etc., and the mixture is passed into a chamber containing a dehydration catalyst heated to the temperature selected for effecting the reaction, where the conversion of the nitrocyclohexane to caprolactam occurs. After leaving the catalyst bed the vapors are passed through a water cooled condenser and the liquid products collected. Additional condensate is collected by passing the off-gas through a Dry-Ice trap. The combined condensate is mixed with benzene and distilled. Water is removed as a benzene azeotrope and the remaining material is distilled under reduced pressure to isolate unconverted nitrocyclohexane, caprolactam, and small amounts of lower and higher boiling materials.

The examples which follow are submitted to illustrate and not to limit this invention. The volumes of reactants are calculated to standard temperatures and pressures.

Example I

An apparatus for the vapor phase conversion of nitrocyclohexane to caprolactam consists of a Pyrex U-tube immersed to a depth of 10 inches in a vapor bath of a material boiling at or near the temperature selected for effecting the reaction. One leg of the U-tube, 15 mm. O. D., is packed with glass helices and fitted to a jacketed delivery burette and the other, 22 mm. O. D., is packed with 50 cc. of a borophosphoric acid catalyst, prepared as described in U. S. Patent 2,200,734. The U-tube is heated by a refluxing vapor to 297° C. During a total reaction time of 350 minutes there is fed into the U-tube reactor 52.5 liters of nitrogen and 8.7 liters of nitrocyclohexane and the mixture is passed over the catalyst at an average reaction temperature of 315° C. Under these conditions the contact time is 7.8 seconds and the space velocity 210 hr.$^{-1}$. From the reaction product there is obtained 12.6 grams of caprolactam, 6.1 cc. of water, 10 grams of unconverted nitrocyclohexane, and 2 grams of low boiling material. The yield of caprolactam, based on the nitrocyclohexane consumed, is 35.3%.

Example II

Example I was duplicated except that the reaction charge consisted of 8.7 liters of nitrocyclohexane, 60.3 liters of nitrogen, and 18 liters of methanol. The temperature of the bath was 280° C. of the catalyst 310° C., and the total reaction time 405 minutes, which calculates to a space velocity of 258 hr.$^{-1}$, and a contact time of 6.5 seconds. Under these conditions there were obtained 12.4 grams of caprolactam, which corresponds to a 30.2% yield. The amount of recovered nitrocyclohexane was 3 grams and low boiling material also 3 grams.

The examples summarized in the table set forth later in columns 3 and 4 were carried out essentially in accord with Example II, except for the difference indicated.

In Example II the vapor bath was a mixture consisting of 73.5% diphenyl oxide and 26.5% diphenyl, said mixture boiling at 260° C., and in the table the experiment constituting the first item, ortho-terphenyl (boiling point 338° C.) was used. Diphenylene oxide (boiling point 285° C.) was employed in all the other examples, including all the experiments recorded in the table, with the exception of the one mentioned previously. In connection with this matter, the observed maximum bath temperatures were usually higher than the boiling points given above because of some slight super-heating.

The contact materials used in the process of this invention belong to the class known in the art as dehydration catalysts. This does not mean that the process of this invention is a dehydration reaction or that dehydration is involved in an important way. These dehydration catalysts may be used severally, or in combination, as such or extended on supports such as charcoal, pumice, clay, fuller's earth, bentonite, silica gel, kieselguhr, etc. Typical dehydration catalysts are alumina, thoria, ceria, zirconia, blue tungsten oxide, titanium oxide, magnesia, heteropolyacids such as borophosphoric acid, phosphotungstic acid, boromolybdic acid, silicotungstic acid, phosphomolybdic acid, and other heteropolyacids, prepared as described in U. S. Patent 2,173,187, silica, boron oxide, beryllium oxide, etc. The preferred catalysts are heteropolyacids, and especially borophosphoric acid, because of their selectivity and activity.

The process of this invention is generally operated at pressures which are essentially atmospheric and at temperatures in the range of 150° to 450° C. Since the best results from the standpoint of reaction rate and yield of desired product are obtained in the range of 200° to 400° C., this range is regarded as the most useful. If desired, pressures above atmospheric, i. e., up to 5 atmospheres can be used. For the most satisfactory results, it is important that temperatures, pressure, etc., be so correlated as to bring about complete vaporization of the nitrocyclohexane.

In practice, it is desirable to operate under an inert gas such as nitrogen or a reducing gas like carbon monoxide or hydrogen and to pass the mixture of gas and vaporized nitrocyclohexane through the catalyst bed.

Substantially improved results, from the standpoint of yield of desired caprolactam, are obtained by including an oxidizable material in the reaction charge. Typical adjuvants of this type are those employed in the working examples. The amount of adjuvant can be varied over wide limits. Generally, however, it is desirable to employ a 1:1 molar amount with the nitrocyclohexane. Larger amounts can be used, in which event the adjuvant also functions as a reaction medium. In practice, the adjuvant and nitrocyclohexane are mixed and the mixture passed into the vaporization zone where it is commingled with the inert or reducing gas, as the case may be, and the mixed gas passed into the heated catalyst zone. It is not necessary to pre-mix the adjuvant and nitrocyclohexane because satisfactory results can be obtained by adding the two separately and allowing the mixing to occur in the vaporization zone or immediately before entrance into the catalyst zone.

The rate at which the nitrocyclohexane, or nitrocyclohexane and adjuvant, is passed through the catalyst, i. e., the contact time and space velocity are critical for optimum results. Generally, the rate of feed is adjusted so as to provide a contact time of from 0.5 to 10 seconds. Since especially good results are realized employing contact times of from 1 to 8 seconds, this constitutes a preferred condition.

In practice, it is observed that as the nitrocyclohexane enters the catalyst zone a hot-spot develops which eventually travels through the catalyst bed. In general, it is desirable to obtain a static temperature condition before passing all of the nitrocyclohexane through the catalyst.

The process of this invention provides a direct alternative route to caprolactam from readily accessible nitrocyclohexane. Caprolactam is an important chemical for conversion to polyamides.

I intend to be limited only by the following claims.

I claim:

1. The process for manufacturing caprolactam which comprises passing vaporized nitrocyclohexane over a solid dehydration catalyst at temperatures between 150° and 450° C.

2. The process for manufacturing caprolactam which comprises passing vaporized nitrocyclohexane over a solid dehydration catalyst at temperatures between 150° and 450° C. and under pressures up to 5 atmospheres.

3. The process for manufacturing caprolactum which comprises passing vaporized nitrocyclohexane over a solid dehydration catalyst at tem-

| Catalyst | Liters of Gas Added at Standard Temperature and Pressure | | | Space Velocity, hr.$^{-1}$ | Contact Time | Average Cat. Temp., °C. | Time, Min. | Percent Yield of Caprolactam |
|---|---|---|---|---|---|---|---|---|
| | Nitrocyclohexane | N$_2$ | Adjuvant | | | | | |
| Borophosphoric acid | 8.7 | 56.5 | Methanol, 18.0 | 262 | 6.0 | 375 | 380 | 35.2 |
| Do | 8.7 | 53.0 | Acetonitrile, 13.4 | 253 | 6.5 | 310 | 355 | 40.5 |
| Do | 8.7 | 43.0 | Benzene, 13.4 | 270 | 6.2 | 315 | 290 | 35.5 |
| Do | 8.7 | 28.5 | Water, 168 | 1,280 | 1.3 | 335 | 192 | 17.8 |
| Do | 3.6 | 21.6 | Trioxane, 10.5 | 298 | 5.4 | 350 | 145 | 17.5 |
| Do | 8.7 | | CO, 77.0 | 294 | 5.4 | 340 | 350 | 30.4 |
| Do | 8.7 | 62.3 | Acetaldehyde, 12.7 | 268 | 6.2 | 315 | 374 | 29.3 |
| Do | 8.7 | 71.0 | Isoproponal, 9.3 | 252 | 6.5 | 315 | 425 | 26.2 |
| Do | 8.7 | 66.6 | 2-Nitropropane, 8.8 | 252 | 6.3 | 335 | 400 | 29.5 |
| Do | 8.7 | 63.4 | Cyclohexanone, 8.7 | 255 | 6.2 | 340 | 380 | 46.5 |
| Do | 8.7 | 62.5 | Formic acid, 9.7 | 258 | 6.2 | 330 | 375 | 30.0 |
| Do | 8.7 | 66.7 | Acetone, 9.7 | 255 | 6.3 | 330 | 400 | 34.3 |
| Do | 8.7 | 50.0 | Dimethylformamide, 9.2 | 272 | 6.1 | 315 | 300 | 38.8 |
| Do | 8.7 | 66.6 | Diethylamine, 9.2 | 254 | 6.5 | 320 | 400 | 35.7 |
| SiO$_2$ | 8.7 | 61.0 | | 230 | 7.1 | 325 | 365 | 18.2 |
| Phosphomolybdic acid on SiO$_2$ silica | 8.7 | 64.1 | | 226 | 7.1 | 340 | 385 | 20.5 |
| Silicotungstic acid on SiO$_2$ | 8.7 | 66.5 | | 226 | 7.3 | 325 | 400 | 23.4 | peratures between 150° and 450° C. and in the presence of a gas selected from inert and reducing gases.

4. The process for manufacturing caprolactam which comprises passing vaporized nitrocyclohexane over a solid dehydration catalyst at temperatures between 150° and 450° C. and maintaining a contact time of from 0.5 to 10 seconds.

5. The process for manufacturing epsilon-caprolactam which comprises passing vaporized nitrocyclohexane over a solid dehydration catalyst at temperatures between 150° and 450° C. and maintaining a contact time of from 0.5 to 10 seconds.

6. The process of claim 1 wherein the catalyst comprises borophosphoric acid.

7. The process of claim 1 wherein the catalyst comprises silica.

8. The process of claim 1 wherein the catalyst comprises silicotungstic acid.

9. The process for manufacturing caprolactam which comprises passing vaporized nitrocyclohexane over a solid dehydration catalyst at temperatures between 150° and 450° C. and in the presence of an adjuvant.

10. The process of claim 9, wherein the adjuvant comprises cyclohexanone.

11. The process of claim 9, wherein the adjuvant comprises acetonitrile.

12. The process of claim 9, wherein the molar ratio of adjuvant to nitrocyclohexane is 1:1.

DAVID C. ENGLAND.

REFERENCES CITED

The following references are of record in the file of this patent:

FOREIGN PATENTS

| Number | Country | Date |
| --- | --- | --- |
| 59,519 | Netherlands | June 16, 1947 |